(12) United States Patent
Wolrich et al.

(10) Patent No.: US 7,620,702 B1
(45) Date of Patent: Nov. 17, 2009

(54) PROVIDING REAL-TIME CONTROL DATA FOR A NETWORK PROCESSOR

(75) Inventors: Gilbert Wolrich, Framingham, MA (US); Debra Bernstein, Sudbury, MA (US); Matthew Adiletta, Worcester, MA (US); William Wheeler, Southborough, MA (US)

(73) Assignee: Intel Corporation, Santa Clara, CA (US)

( * ) Notice: Subject to any disclaimer, the term of this patent is extended or adjusted under 35 U.S.C. 154(b) by 1243 days.

(21) Appl. No.: 09/473,571

(22) Filed: Dec. 28, 1999

(51) Int. Cl.
*G06F 15/177* (2006.01)
(52) U.S. Cl. .................. 709/220; 709/242; 709/253; 709/238
(58) Field of Classification Search ........... 709/200, 709/223–234; 379/100.17; 370/252–253, 370/229–235; 710/1–74
See application file for complete search history.

(56) References Cited

U.S. PATENT DOCUMENTS

| | | | |
|---|---|---|---|
| 3,373,408 A | 3/1968 | Ling | |
| 3,478,322 A | 11/1969 | Evans | |
| 3,623,001 A | 11/1971 | Kleist et al. | |
| 3,736,566 A | 5/1973 | Anderson et al. | |
| 3,792,441 A | 2/1974 | Wymore et al. | |
| 3,889,243 A | 6/1975 | Drimak | |
| 3,940,745 A | 2/1976 | Sajeva | |
| 4,016,548 A | 4/1977 | Law et al. | |
| 4,032,899 A | 6/1977 | Jenny et al. | |
| 4,075,691 A | 2/1978 | Davis et al. | |
| 4,130,890 A | 12/1978 | Adam | |
| 4,400,770 A | 8/1983 | Chan et al. | |
| 4,514,807 A | 4/1985 | Nogi | |
| 4,523,272 A | 6/1985 | Fukunaga et al. | |
| 4,658,351 A | 4/1987 | Teng | |
| 4,709,347 A | 11/1987 | Kirk | |
| 4,745,544 A | 5/1988 | Renner et al. | |
| 4,788,640 A | 11/1988 | Hansen | |
| 4,831,358 A | 5/1989 | Ferrio et al. | |
| 4,858,108 A | 8/1989 | Ogawa et al. | |
| 4,866,664 A | 9/1989 | Burkhardt, Jr. et al. | |
| 4,890,218 A | 12/1989 | Bram | |
| 4,890,222 A | 12/1989 | Kirk | |

(Continued)

FOREIGN PATENT DOCUMENTS

EP 0 379 709 8/1990

(Continued)

OTHER PUBLICATIONS

U.S. Appl. No. 10/726,757, filed Dec. 3, 2003, Wolrich et al.

(Continued)

*Primary Examiner*—David E England
(74) *Attorney, Agent, or Firm*—Fish & Richardson P.C.

(57) ABSTRACT

A multiprocessor includes a module configured to collect status data, one or more processing engines, and a push engine. Part of the status data is collected from devices connected to a bus and indicates readiness of the devices to participate in data transfers over the bus. The processing engines schedule transfers of data packets between the processor and the devices. The push engine performs unsolicited transfers of a portion of the status data to the processing engines in response to the module collecting new status data.

22 Claims, 8 Drawing Sheets

U.S. PATENT DOCUMENTS

| | | | |
|---|---|---|---|
| 4,991,112 A | 2/1991 | Callemyn | |
| 5,115,507 A | 5/1992 | Callemyn | |
| 5,140,685 A | 8/1992 | Sipple et al. | |
| 5,142,683 A | 8/1992 | Burkhardt, Jr. et al. | |
| 5,155,831 A | 10/1992 | Emma et al. | |
| 5,155,854 A | 10/1992 | Flynn et al. | |
| 5,168,555 A | 12/1992 | Byers et al. | |
| 5,173,897 A | 12/1992 | Schrodi et al. | |
| 5,202,987 A | 4/1993 | Bayer et al. | |
| 5,251,205 A | 10/1993 | Callon et al. | |
| 5,255,239 A | 10/1993 | Taborn et al. | |
| 5,263,169 A | 11/1993 | Genusov et al. | |
| 5,313,454 A | 5/1994 | Bustini et al. | |
| 5,347,648 A | 9/1994 | Stamm et al. | |
| 5,367,678 A | 11/1994 | Lee et al. | |
| 5,379,295 A | 1/1995 | Yonehara | |
| 5,379,432 A | 1/1995 | Orton et al. | |
| 5,390,329 A | 2/1995 | Gaertner et al. | |
| 5,392,391 A | 2/1995 | Caulk, Jr. et al. | |
| 5,392,411 A | 2/1995 | Ozaki | |
| 5,392,412 A | 2/1995 | McKenna | |
| 5,404,464 A | 4/1995 | Bennett | |
| 5,404,469 A | 4/1995 | Chung et al. | |
| 5,404,482 A | 4/1995 | Stamm et al. | |
| 5,432,918 A | 7/1995 | Stamm | |
| 5,448,702 A | 9/1995 | Garcia, Jr. et al. | |
| 5,450,351 A | 9/1995 | Heddes | |
| 5,452,437 A | 9/1995 | Richey et al. | |
| 5,452,452 A | 9/1995 | Gaetner et al. | |
| 5,459,842 A | 10/1995 | Begun et al. | |
| 5,459,843 A | 10/1995 | Davis et al. | |
| 5,463,625 A | 10/1995 | Yasrebi | |
| 5,467,452 A | 11/1995 | Blum et al. | |
| 5,475,856 A | 12/1995 | Kogge | |
| 5,485,455 A | 1/1996 | Dobbins et al. | |
| 5,515,296 A | 5/1996 | Agarwal | |
| 5,517,648 A | 5/1996 | Bertone et al. | |
| 5,539,737 A | 7/1996 | Lo et al. | |
| 5,542,070 A | 7/1996 | LeBlanc et al. | |
| 5,542,088 A | 7/1996 | Jennings, Jr. et al. | |
| 5,544,236 A | 8/1996 | Andruska et al. | |
| 5,550,816 A | 8/1996 | Hardwick et al. | |
| 5,557,766 A | 9/1996 | Takiguchi et al. | |
| 5,568,476 A | 10/1996 | Sherer et al. | |
| 5,568,617 A | 10/1996 | Kametani | |
| 5,574,922 A | 11/1996 | James | |
| 5,581,729 A | 12/1996 | Nishtala et al. | |
| 5,592,476 A | 1/1997 | Calamvokis et al. | |
| 5,592,622 A * | 1/1997 | Isfeld et al. | 709/207 |
| 5,613,071 A | 3/1997 | Rankin et al. | |
| 5,613,136 A | 3/1997 | Casavant et al. | |
| 5,617,327 A | 4/1997 | Duncan | |
| 5,623,489 A * | 4/1997 | Cotton et al. | 370/381 |
| 5,625,812 A | 4/1997 | David | |
| 5,627,829 A | 5/1997 | Gleeson et al. | |
| 5,630,074 A | 5/1997 | Beltran | |
| 5,630,130 A | 5/1997 | Perotto et al. | |
| 5,633,865 A | 5/1997 | Short | |
| 5,638,531 A | 6/1997 | Crump et al. | |
| 5,644,623 A * | 7/1997 | Gulledge | 455/423 |
| 5,649,110 A | 7/1997 | Ben-Nun et al. | |
| 5,649,157 A | 7/1997 | Williams | |
| 5,651,002 A | 7/1997 | Van Seters et al. | |
| 5,659,587 A | 8/1997 | Kim et al. | |
| 5,680,641 A | 10/1997 | Sidman | |
| 5,689,566 A | 11/1997 | Nguyen | |
| 5,692,126 A | 11/1997 | Templeton et al. | |
| 5,699,537 A | 12/1997 | Sharangpani et al. | |
| 5,701,434 A | 12/1997 | Nakagawa | |
| 5,717,898 A | 2/1998 | Kagan et al. | |
| 5,721,870 A | 2/1998 | Matsumoto | |
| 5,724,574 A * | 3/1998 | Stratigos et al. | 707/10 |
| 5,740,402 A | 4/1998 | Bratt et al. | |
| 5,742,587 A | 4/1998 | Zornig et al. | |
| 5,742,782 A | 4/1998 | Ito et al. | |
| 5,742,822 A | 4/1998 | Motomura | |
| 5,745,913 A | 4/1998 | Pattin et al. | |
| 5,751,987 A | 5/1998 | Mahant-Shetti et al. | |
| 5,754,764 A | 5/1998 | Davis et al. | |
| 5,761,507 A | 6/1998 | Govett | |
| 5,761,522 A | 6/1998 | Hisanga et al. | |
| 5,764,915 A | 6/1998 | Heimsoth et al. | |
| 5,768,528 A | 6/1998 | Stumm | |
| 5,781,551 A | 7/1998 | Born | |
| 5,781,774 A | 7/1998 | Krick | |
| 5,784,649 A | 7/1998 | Begur et al. | |
| 5,784,712 A | 7/1998 | Byers et al. | |
| 5,796,413 A | 8/1998 | Shipp et al. | |
| 5,797,043 A | 8/1998 | Lewis et al. | |
| 5,805,816 A | 9/1998 | Picazo, Jr. et al. | |
| 5,809,235 A | 9/1998 | Sharma et al. | |
| 5,809,237 A | 9/1998 | Watts et al. | |
| 5,809,530 A | 9/1998 | Samra et al. | |
| 5,812,868 A | 9/1998 | Moyer et al. | |
| 5,828,746 A | 10/1998 | Ardon | |
| 5,828,863 A | 10/1998 | Barrett et al. | |
| 5,828,881 A | 10/1998 | Wang | |
| 5,828,901 A | 10/1998 | O'Toole et al. | |
| 5,832,215 A | 11/1998 | Kato et al. | |
| 5,835,755 A | 11/1998 | Stellwagen, Jr. | |
| 5,838,988 A | 11/1998 | Panwar et al. | |
| 5,850,399 A | 12/1998 | Ganmukhi et al. | |
| 5,850,530 A | 12/1998 | Chen et al. | |
| 5,854,922 A | 12/1998 | Gravenstein et al. | |
| 5,857,188 A | 1/1999 | Douglas | |
| 5,860,138 A | 1/1999 | Engebretsen et al. | |
| 5,860,158 A | 1/1999 | Pai et al. | |
| 5,886,992 A | 3/1999 | Raatikaien et al. | |
| 5,887,134 A * | 3/1999 | Ebrahim | 709/200 |
| 5,890,208 A | 3/1999 | Kwon | |
| 5,892,979 A * | 4/1999 | Shiraki et al. | 710/52 |
| 5,898,686 A | 4/1999 | Virgile | |
| 5,898,701 A | 4/1999 | Johnson | |
| 5,898,885 A | 4/1999 | Dickol et al. | |
| 5,905,876 A | 5/1999 | Pawlowski et al. | |
| 5,905,889 A | 5/1999 | Wilhelm, Jr. | |
| 5,909,686 A | 6/1999 | Muller et al. | |
| 5,915,123 A | 6/1999 | Mirsky et al. | |
| 5,918,235 A | 6/1999 | Kirshenbaum et al. | |
| 5,933,627 A | 8/1999 | Parady | |
| 5,937,187 A | 8/1999 | Kosche et al. | |
| 5,938,736 A * | 8/1999 | Muller et al. | 709/243 |
| 5,940,612 A | 8/1999 | Brady et al. | |
| 5,940,866 A | 8/1999 | Chisholm et al. | |
| 5,946,487 A | 8/1999 | Dangelo | |
| 5,948,081 A | 9/1999 | Foster | |
| 5,953,336 A | 9/1999 | Moore et al. | |
| 5,958,031 A | 9/1999 | Kime | |
| 5,960,210 A | 9/1999 | Jin | |
| 5,961,628 A | 10/1999 | Nguyen et al. | |
| 5,968,169 A | 10/1999 | Pickett | |
| 5,970,013 A | 10/1999 | Fischer et al. | |
| 5,974,518 A | 10/1999 | Nogradi | |
| 5,978,838 A | 11/1999 | Mohamed et al. | |
| 5,983,274 A | 11/1999 | Hyder et al. | |
| 5,995,513 A | 11/1999 | Harrand et al. | |
| 6,012,151 A | 1/2000 | Mano | |
| 6,014,729 A | 1/2000 | Lannan et al. | |
| 6,023,742 A | 2/2000 | Ebeling et al. | |
| 6,032,190 A | 2/2000 | Bremer et al. | |
| 6,032,218 A | 2/2000 | Lewin et al. | |
| 6,047,002 A | 4/2000 | Hartmann et al. | |
| 6,049,867 A | 4/2000 | Eickemeyer et al. | |
| 6,058,168 A * | 5/2000 | Braband | 379/93.24 |

| Patent | Date | Inventor |
|---|---|---|
| 6,061,710 A | 5/2000 | Eickemeyer et al. |
| 6,067,300 A | 5/2000 | Baumert et al. |
| 6,067,585 A | 5/2000 | Hoang |
| 6,070,231 A | 5/2000 | Ottinger |
| 6,072,781 A | 6/2000 | Feeney et al. |
| 6,073,215 A | 6/2000 | Snyder |
| 6,079,008 A | 6/2000 | Clery, III |
| 6,085,215 A | 7/2000 | Ramakrishnan et al. |
| 6,085,248 A | 7/2000 | Sambamurthy et al. |
| 6,085,294 A | 7/2000 | Van Doren et al. |
| 6,092,127 A | 7/2000 | Tausheck |
| 6,092,158 A | 7/2000 | Harriman et al. |
| 6,104,700 A * | 8/2000 | Haddock et al. ............ 370/235 |
| 6,111,886 A | 8/2000 | Stewart |
| 6,112,016 A | 8/2000 | MacWilliams et al. |
| 6,122,251 A | 9/2000 | Shinohara |
| 6,128,669 A | 10/2000 | Moriarty et al. |
| 6,134,665 A * | 10/2000 | Klein et al. ................. 713/300 |
| 6,141,677 A | 10/2000 | Hanif et al. |
| 6,141,689 A | 10/2000 | Yasrebi |
| 6,141,765 A | 10/2000 | Sherman |
| 6,144,669 A * | 11/2000 | Williams et al. ............ 370/401 |
| 6,145,054 A | 11/2000 | Mehrotra et al. |
| 6,157,955 A | 12/2000 | Narad et al. |
| 6,160,562 A | 12/2000 | Chin et al. |
| 6,170,051 B1 | 1/2001 | Dowling |
| 6,175,927 B1 | 1/2001 | Cromer et al. |
| 6,182,177 B1 | 1/2001 | Harriman |
| 6,195,676 B1 | 2/2001 | Spix et al. |
| 6,199,133 B1 | 3/2001 | Schnell |
| 6,201,807 B1 | 3/2001 | Prasanna |
| 6,212,542 B1 | 4/2001 | Kahle et al. |
| 6,212,544 B1 | 4/2001 | Borkenhagen et al. |
| 6,212,604 B1 | 4/2001 | Tremblay |
| 6,212,611 B1 | 4/2001 | Nizar et al. |
| 6,216,220 B1 | 4/2001 | Hwang |
| 6,223,207 B1 | 4/2001 | Lucovsky et al. |
| 6,223,238 B1 | 4/2001 | Meyer et al. |
| 6,223,243 B1 | 4/2001 | Ueda et al. |
| 6,223,274 B1 | 4/2001 | Catthoor et al. |
| 6,223,279 B1 | 4/2001 | Nishimura et al. |
| 6,226,680 B1 | 5/2001 | Boucher et al. |
| 6,247,025 B1 | 6/2001 | Bacon |
| 6,256,713 B1 | 7/2001 | Audityan et al. |
| 6,269,391 B1 | 7/2001 | Gillespie |
| 6,272,109 B1 | 8/2001 | Pei et al. |
| 6,272,520 B1 | 8/2001 | Sharangpani et al. |
| 6,272,616 B1 | 8/2001 | Fernando et al. |
| 6,275,505 B1 * | 8/2001 | O'Loughlin et al. ........ 370/473 |
| 6,279,113 B1 * | 8/2001 | Vaidya ....................... 713/201 |
| 6,282,169 B1 | 8/2001 | Kiremidjian |
| 6,286,083 B1 | 9/2001 | Chin et al. |
| 6,289,011 B1 | 9/2001 | Seo et al. |
| 6,295,600 B1 | 9/2001 | Parady |
| 6,298,370 B1 | 10/2001 | Tang et al. |
| 6,307,789 B1 | 10/2001 | Wolrich et al. |
| 6,311,261 B1 | 10/2001 | Chamdani et al. |
| 6,320,861 B1 | 11/2001 | Adam et al. |
| 6,324,624 B1 | 11/2001 | Wolrich et al. |
| 6,335,932 B2 | 1/2002 | Kadambi et al. |
| 6,338,078 B1 | 1/2002 | Chang et al. |
| 6,345,334 B1 | 2/2002 | Nakagawa et al. |
| 6,347,344 B1 | 2/2002 | Baker et al. |
| 6,349,331 B1 | 2/2002 | Andra et al. |
| 6,356,962 B1 * | 3/2002 | Kasper ........................ 710/29 |
| 6,359,911 B1 | 3/2002 | Movshovich et al. |
| 6,360,262 B1 | 3/2002 | Guenthner et al. |
| 6,360,277 B1 | 3/2002 | Ruckley et al. |
| 6,366,998 B1 | 4/2002 | Mohamed |
| 6,373,848 B1 | 4/2002 | Allison et al. |
| 6,377,998 B2 | 4/2002 | Noll et al. |
| 6,389,031 B1 | 5/2002 | Chao et al. |
| 6,389,449 B1 | 5/2002 | Nermirovsky et al. |
| 6,393,026 B1 | 5/2002 | Irwin |
| 6,393,483 B1 | 5/2002 | Latif et al. |
| 6,404,737 B1 | 6/2002 | Novick et al. |
| 6,415,338 B1 | 7/2002 | Habot |
| 6,418,488 B1 * | 7/2002 | Chilton et al. ................. 710/20 |
| 6,424,657 B1 | 7/2002 | Voit et al. |
| 6,424,659 B2 | 7/2002 | Viswanadham et al. |
| 6,426,940 B1 | 7/2002 | Seo et al. |
| 6,426,943 B1 | 7/2002 | Spinney et al. |
| 6,427,196 B1 | 7/2002 | Adiletta et al. |
| 6,430,626 B1 * | 8/2002 | Witkowski et al. .......... 709/249 |
| 6,434,145 B1 | 8/2002 | Opsasnick et al. |
| 6,438,132 B1 | 8/2002 | Vincent et al. |
| 6,438,134 B1 | 8/2002 | Chow et al. |
| 6,448,812 B1 | 9/2002 | Bacigalupo |
| 6,453,404 B1 | 9/2002 | Bereznyi et al. |
| 6,457,015 B1 | 9/2002 | Eastham |
| 6,463,035 B1 | 10/2002 | Moore |
| 6,463,072 B1 | 10/2002 | Wolrich et al. |
| 6,463,480 B2 | 10/2002 | Kikuchi et al. |
| 6,463,527 B1 | 10/2002 | Vishkin |
| 6,466,898 B1 | 10/2002 | Chan |
| 6,477,562 B2 | 11/2002 | Nemirovsky et al. |
| 6,484,224 B1 | 11/2002 | Robins et al. |
| 6,493,754 B1 | 12/2002 | Rosborough et al. |
| 6,501,731 B1 | 12/2002 | Chong et al. |
| 6,507,862 B1 | 1/2003 | Joy et al. |
| 6,522,188 B1 | 2/2003 | Poole |
| 6,526,451 B2 | 2/2003 | Kasper |
| 6,526,452 B1 | 2/2003 | Petersen et al. |
| 6,529,983 B1 | 3/2003 | Marshall et al. |
| 6,532,509 B1 | 3/2003 | Wolrich et al. |
| 6,535,878 B1 | 3/2003 | Guedalia et al. |
| 6,552,826 B2 * | 4/2003 | Adler et al. .................. 358/442 |
| 6,553,406 B1 | 4/2003 | Berger et al. |
| 6,560,667 B1 | 5/2003 | Wolrich et al. |
| 6,570,850 B1 | 5/2003 | Gutierrez et al. |
| 6,577,542 B2 | 6/2003 | Wolrich et al. |
| 6,584,522 B1 | 6/2003 | Wolrich et al. |
| 6,587,906 B2 | 7/2003 | Wolrich et al. |
| 6,604,125 B1 | 8/2003 | Belkin |
| 6,606,326 B1 | 8/2003 | Herring |
| 6,606,704 B1 | 8/2003 | Adiletta et al. |
| 6,625,654 B1 | 9/2003 | Wolrich et al. |
| 6,628,668 B1 | 9/2003 | Hutzli et al. |
| 6,629,147 B1 | 9/2003 | Grow |
| 6,629,236 B1 | 9/2003 | Aipperspach et al. |
| 6,631,422 B1 | 10/2003 | Althaus et al. |
| 6,631,430 B1 | 10/2003 | Wolrich et al. |
| 6,631,462 B1 | 10/2003 | Wolrich et al. |
| 6,657,963 B1 | 12/2003 | Paquette et al. |
| 6,658,551 B1 | 12/2003 | Berenbaum et al. |
| 6,661,774 B1 | 12/2003 | Lauffenburger et al. |
| 6,661,794 B1 | 12/2003 | Wolrich et al. |
| 6,665,699 B1 | 12/2003 | Hunter et al. |
| 6,665,755 B2 | 12/2003 | Modelski et al. |
| 6,667,920 B2 | 12/2003 | Wolrich et al. |
| 6,668,317 B1 | 12/2003 | Bernstein et al. |
| 6,671,827 B2 | 12/2003 | Guilford et al. |
| 6,675,190 B1 | 1/2004 | Schabernack et al. |
| 6,675,192 B2 | 1/2004 | Emer et al. |
| 6,678,746 B1 | 1/2004 | Russell et al. |
| 6,680,933 B1 | 1/2004 | Cheesman et al. |
| 6,681,300 B2 | 1/2004 | Wolrich et al. |
| 6,684,326 B1 | 1/2004 | Cromer et al. |
| 6,694,380 B1 | 2/2004 | Wolrich et al. |
| 6,697,379 B1 | 2/2004 | Jacquet et al. |
| 6,721,325 B1 | 4/2004 | Duckering et al. |
| 6,724,767 B1 | 4/2004 | Chong et al. |
| 6,728,845 B2 | 4/2004 | Adiletta et al. |
| 6,732,187 B1 | 5/2004 | Lougheed et al. |
| 6,754,211 B1 | 6/2004 | Brown |
| 6,754,222 B1 | 6/2004 | Joung et al. |

| | | |
|---|---|---|
| 6,768,717 B1 | 7/2004 | Reynolds et al. |
| 6,775,284 B1 | 8/2004 | Calvignac et al. |
| 6,792,488 B2 | 9/2004 | Wolrich et al. |
| 6,798,744 B1 | 9/2004 | Loewen et al. |
| 6,826,615 B2 | 11/2004 | Barrall et al. |
| 6,834,053 B1 | 12/2004 | Stacey et al. |
| 6,850,521 B1 | 2/2005 | Kadambi et al. |
| 6,856,622 B1 | 2/2005 | Calamvokis et al. |
| 6,873,618 B1 | 3/2005 | Weaver |
| 6,876,561 B2 | 4/2005 | Wolrich et al. |
| 6,895,457 B2 | 5/2005 | Wolrich et al. |
| 6,925,637 B2 | 8/2005 | Thomas et al. |
| 6,931,641 B1 | 8/2005 | Davis et al. |
| 6,934,780 B2 | 8/2005 | Modelski et al. |
| 6,934,951 B2 | 8/2005 | Wilkinson et al. |
| 6,938,147 B1 | 8/2005 | Joy et al. |
| 6,944,850 B2 | 9/2005 | Hooper et al. |
| 6,947,425 B1 | 9/2005 | Hooper et al. |
| 6,952,824 B1 | 10/2005 | Hooper et al. |
| 6,959,002 B2 | 10/2005 | Wynne et al. |
| 6,967,963 B1 | 11/2005 | Houh et al. |
| 6,976,095 B1 | 12/2005 | Wolrich et al. |
| 6,981,077 B2 | 12/2005 | Modelski et al. |
| 6,983,350 B1 | 1/2006 | Wheeler et al. |
| 7,006,495 B2 | 2/2006 | Hooper |
| 7,065,569 B2 | 6/2006 | Teraslinna |
| 7,069,548 B2 | 6/2006 | Kushlis |
| 7,096,277 B2 | 8/2006 | Hooper |
| 7,100,102 B2 | 8/2006 | Hooper et al. |
| 7,111,072 B1 | 9/2006 | Matthews et al. |
| 7,111,296 B2 | 9/2006 | Wolrich et al. |
| 7,124,196 B2 | 10/2006 | Hooper |
| 7,126,952 B2 | 10/2006 | Hooper et al. |
| 7,149,786 B1 | 12/2006 | Bohringer et al. |
| 7,181,742 B2 | 2/2007 | Hooper |
| 7,191,321 B2 | 3/2007 | Bernstein et al. |
| 7,206,858 B2 | 4/2007 | Hooper et al. |
| 7,248,584 B2 | 7/2007 | Hooper |
| 7,305,500 B2 | 12/2007 | Adiletta et al. |
| 7,328,289 B2 | 2/2008 | Wolrich et al. |
| 7,352,769 B2 | 4/2008 | Hooper et al. |
| 7,424,579 B2 | 9/2008 | Wheeler et al. |
| 7,433,307 B2 | 10/2008 | Hooper et al. |
| 7,434,221 B2 | 10/2008 | Hooper et al. |
| 7,443,836 B2 | 10/2008 | Hooper et al. |
| 2001/0023487 A1 | 9/2001 | Kawamoto |
| 2002/0027448 A1 | 3/2002 | Bacigalupo |
| 2002/0041520 A1 | 4/2002 | Wolrich et al. |
| 2002/0075878 A1 | 6/2002 | Lee et al. |
| 2002/0118692 A1 | 8/2002 | Oberman et al. |
| 2002/0150047 A1 | 10/2002 | Knight et al. |
| 2002/0181194 A1 | 12/2002 | Ho et al. |
| 2003/0043803 A1 | 3/2003 | Hooper |
| 2003/0067934 A1 | 4/2003 | Hooper et al. |
| 2003/0086434 A1 | 5/2003 | Kloth |
| 2003/0105901 A1 | 6/2003 | Wolrich et al. |
| 2003/0105917 A1 | 6/2003 | Ostler et al. |
| 2003/0110166 A1 | 6/2003 | Wolrich et al. |
| 2003/0115347 A1 | 6/2003 | Wolrich et al. |
| 2003/0115426 A1 | 6/2003 | Rosenbluth et al. |
| 2003/0131198 A1 | 7/2003 | Wolrich et al. |
| 2003/0140196 A1 | 7/2003 | Wolrich et al. |
| 2003/0145159 A1 | 7/2003 | Adiletta et al. |
| 2003/0147409 A1 | 8/2003 | Wolrich et al. |
| 2003/0161303 A1 | 8/2003 | Mehrvar et al. |
| 2003/0161337 A1 | 8/2003 | Weinman, Jr. |
| 2003/0196012 A1 | 10/2003 | Wolrich et al. |
| 2003/0210574 A1 | 11/2003 | Wolrich et al. |
| 2003/0231635 A1 | 12/2003 | Kalkunte et al. |
| 2004/0039895 A1 | 2/2004 | Wolrich et al. |
| 2004/0052269 A1 | 3/2004 | Hooper et al. |
| 2004/0054880 A1 | 3/2004 | Bernstein et al. |
| 2004/0059828 A1 | 3/2004 | Hooper et al. |
| 2004/0071152 A1 | 4/2004 | Wolrich et al. |
| 2004/0073728 A1 | 4/2004 | Wolrich et al. |
| 2004/0073778 A1 | 4/2004 | Adiletta et al. |
| 2004/0085901 A1 | 5/2004 | Hooper et al. |
| 2004/0098496 A1 | 5/2004 | Wolrich et al. |
| 2004/0109369 A1 | 6/2004 | Wolrich et al. |
| 2004/0148382 A1 | 7/2004 | Narad et al. |
| 2004/0162933 A1 | 8/2004 | Adiletta et al. |
| 2004/0252686 A1 | 12/2004 | Hooper et al. |
| 2005/0033884 A1 | 2/2005 | Wolrich et al. |
| 2005/0149665 A1 | 7/2005 | Wolrich et al. |
| 2006/0007871 A1 | 1/2006 | Welin |
| 2006/0069882 A1 | 3/2006 | Wheeler et al. |
| 2006/0156303 A1 | 7/2006 | Hooper et al. |

FOREIGN PATENT DOCUMENTS

| | | |
|---|---|---|
| EP | 0 464 715 | 1/1992 |
| EP | 0 633 678 | 1/1995 |
| EP | 0 745 933 | 12/1996 |
| EP | 0 773 648 | 5/1997 |
| EP | 0 809 180 | 11/1997 |
| EP | 0 959 602 | 11/1999 |
| GB | 2327784 | 2/1999 |
| JP | 59111533 | 6/1984 |
| WO | WO 94/15287 | 7/1994 |
| WO | WO 97/38372 | 10/1997 |
| WO | WO 98/20647 | 5/1998 |
| WO | WO 99/09469 | 2/1999 |
| WO | WO 00/38376 | 6/2000 |
| WO | WO 00/56024 | 9/2000 |
| WO | WO 01/15718 | 3/2001 |
| WO | WO 01/16718 | 3/2001 |
| WO | WO 01/16769 | 3/2001 |
| WO | WO 01/16770 | 3/2001 |
| WO | WO 01/16782 | 3/2001 |
| WO | WO 01/17179 | 3/2001 |
| WO | WO 01/31856 | 5/2001 |
| WO | WO 01/48596 | 7/2001 |
| WO | WO 01/48606 | 7/2001 |
| WO | WO 01/48619 | 7/2001 |
| WO | WO 01/50247 | 7/2001 |
| WO | WO 01/50679 | 7/2001 |
| WO | WO 03/030461 | 4/2003 |

OTHER PUBLICATIONS

U.S. Appl. No. 10/684,078, filed Oct. 10, 2003, Wolrich et al.
U.S. Appl. No. 10/664,202, filed Sep. 16, 2003, Wolrich et al.
U.S. Appl. No. 10/644,337, filed Aug. 20, 2003, Wolrich et al.
U.S. Appl. No. 10/643,438, filed Aug. 19, 2003, Bernstein et al.
U.S. Appl. No. 10/615,500, filed Jul. 8, 2003, Adiletta.
U.S. Appl. No. 10/615,280, filed Jul. 8, 2003, Wolrich et al.
U.S. Appl. No. 10/440,079, filed May 15, 2003, Wolrich et al.
U.S. Appl. No. 10/208,264, filed Jul. 30, 2002, Adiletta et al.
U.S. Appl. No. 09/476,303, filed Dec. 30, 1999, Wolrich et al.
U.S. Appl. No. 09/475,614, filed Dec. 30, 1999, Wolrich et al.
U.S. Appl. No. 09/387,109, filed Aug. 31, 1999, Adiletta et al.
Byrd et al., "Multithread Processor Architectures," *IEEE Spectrum*, vol. 32, No. 8, New York, Aug. 1, 1995, pp. 38-46.
Doyle et al., *Microsoft Press Computer Dictionary*, 2$^{nd}$ ed., Microsoft Press, Redmond, Washington, USA, 1994, p. 326.
Fillo et al., "The M-Machine Multicomputer," IEEE Proceedings of MICRO-28, 1995, pp. 146-156.
Gomez et al., "Efficient Multithreaded User-Space Transport for Network Computing: Design and Test of the TRAP Protocol," *Journal of Parallel and Distributed Computing*, Academic Press, Duluth, Minnesota, USA, vol. 40, No. 1, Jan. 10, 1997, pp. 103-117.
Haug et al., "Reconfigurable hardware as shared resource for parallel threads," IEEE Symposium on FPGAs for Custom Computing Machines, 1998.
Hauser et al., "Garp: a MIPS processor with a reconfigurable coprocessor," Proceedings of the 5$^{th}$ Annual IEEE Symposium on Field-Programmable Custom Computing Machines, 1997.

Hyde, R., "Overview of Memory Management," *Byte*, vol. 13, No. 4, 1998, pp. 219-225.

Litch et al., "StrongARMing Portable Communications," IEEE Micro, 1998, pp. 48-55.

Schmidt et al., "The Performance of Alternative Threading Architectures for Parallel Communication Subsystems," Internet Document, *Online!*, Nov. 13, 1998.

Thistle et al., "A Processor Architecture for Horizon," IEEE, 1998, pp. 35-41.

Tremblay et al., "A Three Dimensional Register File for Superscalar Processors," IEEE Proceedings of the 28th Annual Hawaii International Conference on System Sciences, 1995, pp. 191-201.

Trimberger et al, "A time-multiplexed FPGA," Proceedings of the 5th Annual IEEE Symposium on Field-Programmable Custom Computing Machines, 1998.

Turner et al., "Design of a High Performance Active Router," Internet Document, *Online*, Mar. 18, 1999.

Vibhatavanijt et al., "Simultaneous Multithreading-Based Routers," Proceedings of the 2000 International Conference of Parallel Processing, Toronto, Ontario, Canada, Aug. 21-24, 2000, pp. 362-359.

Wazlowski et al., "PRSIM-II computer and architecture," IEEE Proceedings, Workshop on FPGAs for Custom Computing Machines, 1993.

"10-/100-Mbps Ethernet Media Access Controller (MAC) Core", NEC, 1998, pp. 1-5.

"Nomadic Threads: A migrating multithread approach to remote memory accesses in multiprocessors", by Jenks, S.; Gaudiot, J.L. (abstract only) Publication Date: Oct. 20-23, 1996.

"Overview of the START (*T) multithreaded computer" by Beckeerie, M.J. (abstract only) Publication Date: Feb. 22-26, 1993.

A. Ippoliti, et al., "Parallel Media Access Controller for Packet Communications at Gb/s Rates", 1990, IEEE, pp. 991-996.

Howard Frazier, "Gigabit Ethernet: From 100 to 1,000 Mbps", 1999, IEEE Internet Computing, pp. 24-31.

Howard Frazier, "The 802.3z Gigabit Ethernet Standard", 1998, IEEE Network, pp. 6-7.

"Enterprise Hardware, Intel Expected to Unveil New Networking Chip," News.Com, Aug. 26, 1999, <http://new.com.com/Intel+expected+to+unveil+new+networking+chip/2100-1001_3-230315.html> (accessed on Aug. 23, 2005), pp. 1-5.

"The ATM Forum Technical Committee Traffic Management Specification Version 4.1", The ATM Forum (Mar. 1999).

Agarwal et al., "Apr.: A Processor Architecture for Multiprocessing," Proceedings of the 17th Annual International Symposium on Computer Architecutre, *IEEE*, pp. 104-114, (1990).

Chandranmenon, G.P., et al., "Trading Packet Headers for Packet Processing", *IEEE/ACM Transactions on Networking*, 4(2):141-152, Apr. 1996.

Chappell, et al., "Simultaneous Subordinate Microthreading (SSMT)", *IEEE*, pp. 186-195 (1999).

*Dictionary of Computer Words: An A to Z Guide to Today's Computers, Revised Edition*, Houghton Mifflin Company: Boston, Massachusetts, p. 220, (1995).

*Digital Semiconductor 21140A PCI Fast Ethernet LAN Controller, Hardware Reference Manual*, Digital Equipment Corporation, pp. i-x, 1-1 through 1-5, 2-1 throught 2-12, 3-1 through 3-38, 4-31 through 5-2, 6-1 through 6-24, (Mar. 1998).

Farrens, et al., "Strategies for Achieving Improved Processor Throughput", *AAM*, pg. 362-369 (1991).

Giroux, N., et al., "Queuing and Scheduling: Quality of Service in ATM Networks, Chapter 5", Quality of Service in ATM Networks: State-of-the-Art Traffic Management, pp. 96-121 (1998).

Govind, et al., "Performance modeling and architecture exploration of network processors", *Quantitative Evaluation of Systems*, abstract only (1 page), Sep. 2005.

Kaiserswerth, M., "The Parallel Protocol Engine", *IEEE/ACM Transactions on Networking*, 1(6):650-663, Dec. 1993.

Khailany, B., et al., "Imagine: Media Processing with Streams," IEEE Micro, Mar.-Apr. 2001, pp. 35-46.

Leon-Garcia, A., *Communication Networks: Fundamental Concepts and Key Architectures*, McGraw-Hill Higher Education, Copyright 2000, pp. 195-198, 215-219, & 380-385.

Lim, A., et al., "Improving Performance of Adaptive Media Access Control Protocols for High-Density Wireless Networks", *Proceedings of the 1999 International Symposium on Parallel Architectures, Algorithms and Networks (ISPAN '99)*, pp. 316-321, Jun. 1999.

Mollenauer, J.F., et al., "An Efficient Media Access Control Protocol for Broadband Wireless Access Systems", *IEEE Standard, IEEE 802.16 Broadband Wireless Access Working Group*, 19 pages, Oct. 1999.

Ocheltree, K.B., et al., "A comparison of fibre channel and 802 MAC services", *Proceedings of 18th Conference on Local Computer Networks*, abstract only, 1 page, Sep. 1993.

Shaw, M.C., et al., *UNIX Internals: a Systems Operations Handbook*, Windcrest Books, pp. 30-37.

Todorova, P., et al., "Quality-of-Service-Oriented Media Access Control for Advanced Mobile Multimedia Satellite Systems", *Proceedings of the 36th Annual Hawaii International Conference on System Sciences (HICSS '03)*, 8 pages, Jan. 2003.

Vuppala, V., et al., "Layer-3 switching using virtual network ports", *IEEE Proc. Computer Communications and Networks*, pp. 642-648, 1999.

Wikipedia entry, "Media Access Control", retrieved from http://en.wikipedia.org/wiki/Media_access_control, 2 pages, Jul. 31, 2007.

* cited by examiner

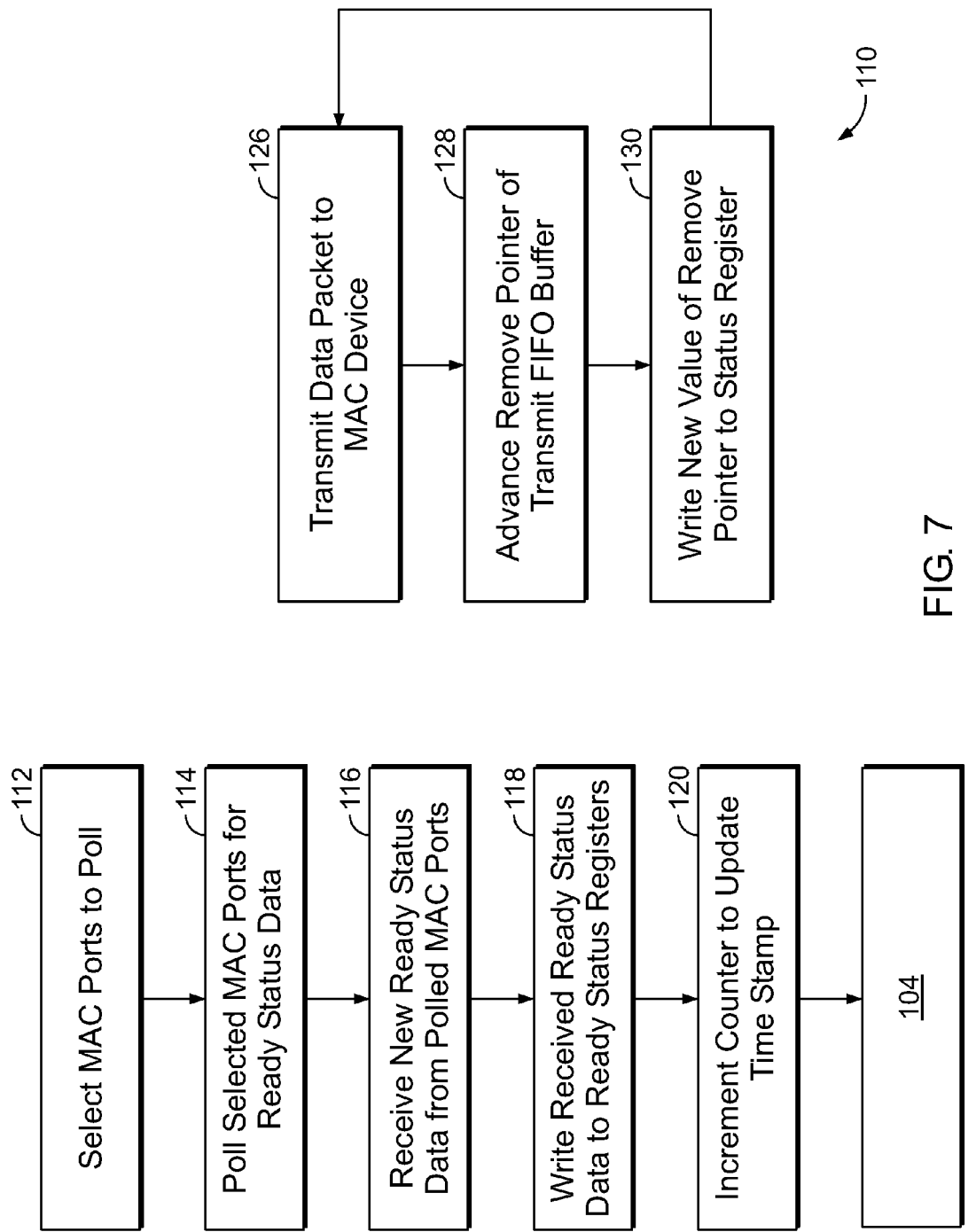

PROVIDING REAL-TIME CONTROL DATA FOR A NETWORK PROCESSOR

BACKGROUND OF THE INVENTION

This invention relates to controlling parallel processor arrays.

Many modern routers use application specific integrated circuits (ASIC's) to perform routing functions. The ASIC's can be designed to handle the protocols used by the networks connected to the router. In particular, the ASIC's can route high provide high performance routing for data packets having one of a preselected set of protocols.

SUMMARY OF THE INVENTION

According to one aspect of the invention, a processor includes a module configured to collect status data, one or more processing engines, and a push engine. The status data is collected from devices connected to a bus. The status data indicates readiness of the devices to participate in data transfers over the bus. The processing engines schedule transfers of data packets between the processor and the devices. The push engine performs unsolicited transfers of a portion of the status data to the processing engines in response to the module collecting new status data.

BRIEF DESCRIPTION OF THE DRAWINGS

FIG. 7 is a flow chart showing a process for collecting ready-status data from the MAC devices;

DESCRIPTION

Figure 1:
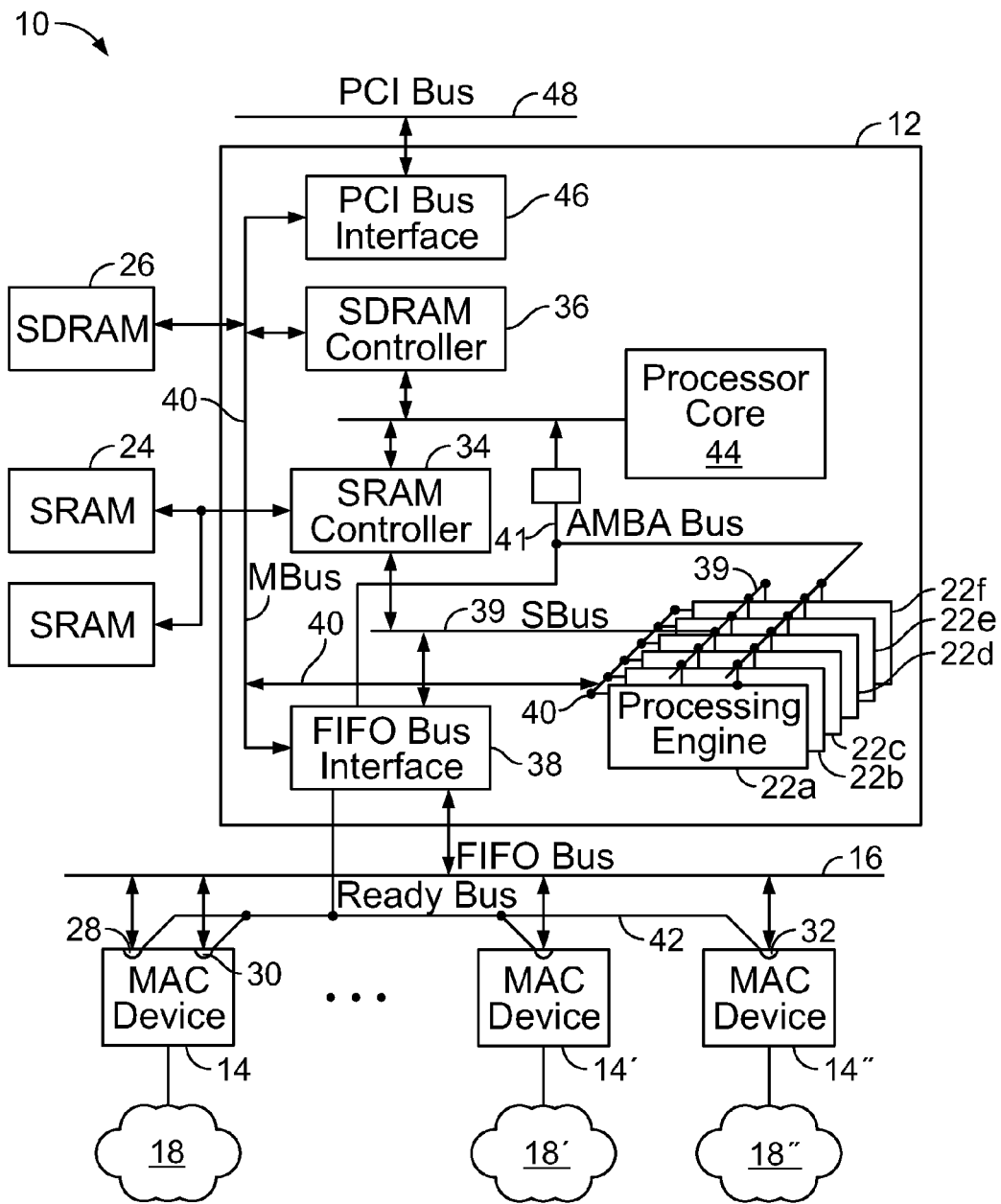
FIG. 1 is a block diagram of a router based on a parallel processor.

FIG. 1 is a block diagram of a router 10 that uses a parallel processor 12, a set of media access chip (MAC) devices 14, 14', 14", and a FIFO bus 16. The router 10 performs data switching between source and destination networks 18, 18', 18" connected to the MAC devices 14, 14', 14". The MAC devices 14, 14', 14" are bridges that couple external networks 18, 18', 18" to the FIFO bus 16. The processor 12 can execute software to control data routing. By basing control on software, the processor 12 may be more easily modified to accommodate new protocols or data characteristics.

The router 10 performs data routing in two stages. First, one of the MAC devices 14, 14', 14" connected to the source network 18, 18', 18" transmits a data packet to the parallel processor 12 via the FIFO bus 16. Second, the parallel processor 12 retransmits the data packet over the FIFO bus 18 to the MAC device 14, 14', 14" connected to the destination network 18, 18', 18". The data transmissions over the FIFO bus 16 employ 64-byte data packets and proceed via an Ethernet protocol.

The parallel processor 12 has a parallel data forwarding structure that includes an array of identical processing engines 22a-22f. Each processing engine 22a-22f has an internal structure for executing a plurality of, e.g., four, independent threads.

Figure 2:
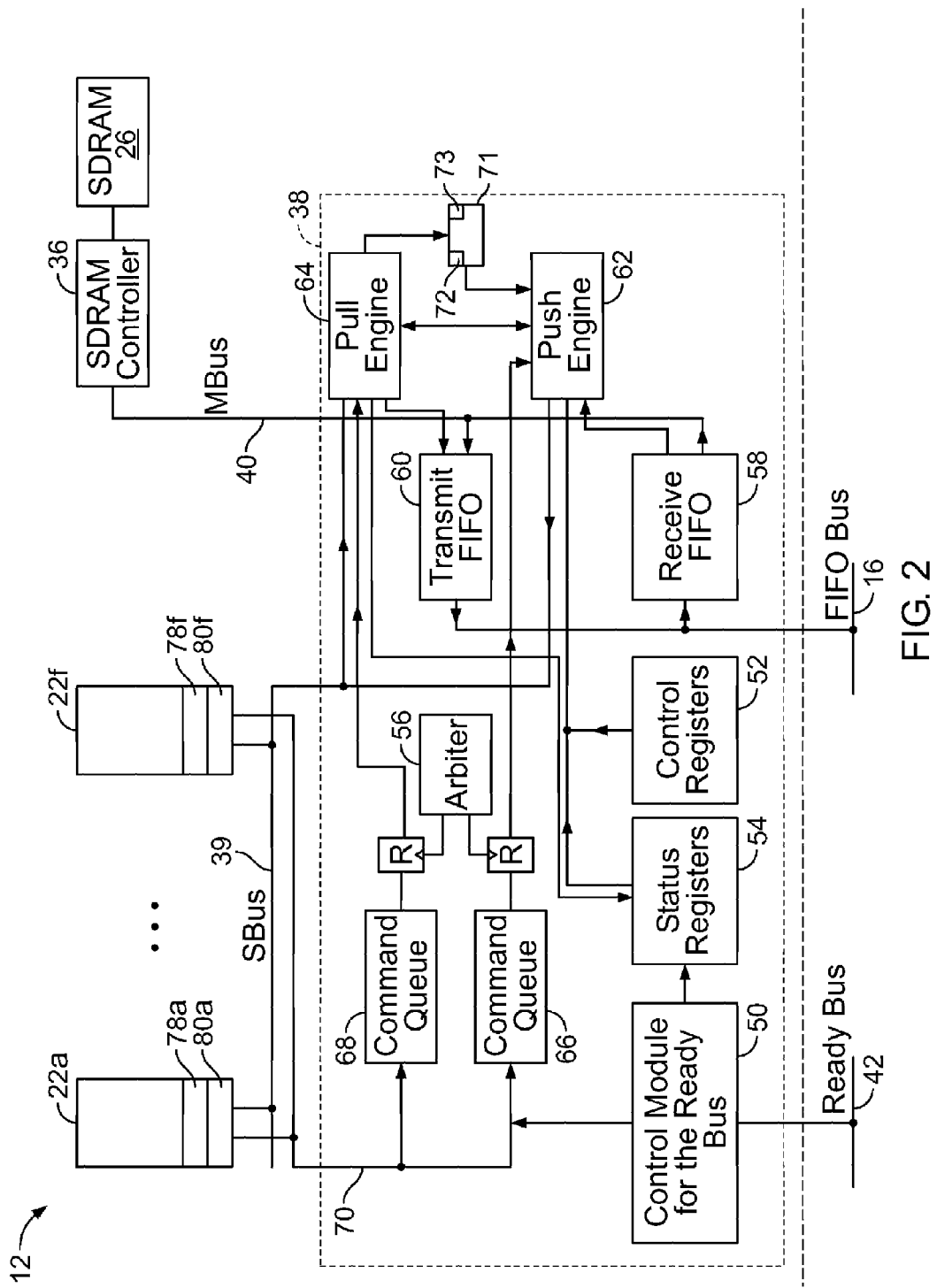
FIG. 2 is a block diagram of a FIFO bus interface of the parallel processor of FIG. 1.

Referring to FIGS. 1 and 2, the processing engines 22a-22f process data packets received from the MAC devices 14, 14', 14". To process a data packet, one of the processing engines 22a-22f looks up routing information in a synchronous random-access memory (SRAM) 24 using information from the packet header. The processing engines 22a-22f also move the data packets from a FIFO buffer 58 to a queue in a synchronous dynamic random-access memory (SDRAM) 26. The FIFO buffer 58 temporarily stores data packets received from the MAC devices 14, 14', 14". The various queues located in the SDRAM 26 are classified by destination MAC device 14, 14', 14" and retransmission priority.

The processing engines 22a-22f also process data from the queues of the SDRAM 26. This processing includes moving data packets from the queues of the SDRAM 26 to a FIFO buffer 60. The FIFO buffer 60 temporarily stores data prior to retransmission to the MAC devices 14, 14', 14" over the FIFO bus 16. Along with the data, associated control and destination information are stored in the FIFO buffer 60 for use in transmitting the data. The associated data is 16 bytes wide.

The SRAM 24 and SDRAM 26 couple to the processing engines 22a-22f through respective SRAM and SDRAM controllers 34, 36. The SRAM controller 34 has content addressable memory that supports look ups of identification information on the queues of the SDRAM 24. The look-ups use header data from received data packets. The SDRAM controller 36 coordinates data writes to and reads from the queues of the SDRAM 24 that store received data packets.

The parallel processor 12 has several internal busses 39, 40, 41. An S bus 39 couples the processing engines 22a-22f to a FIFO bus interface 38 (FBI) and to the SRAM controller 34. An M bus 40 couples the processing engines 22a-22f and the FBI 38 to the SDRAM controller 36 and the SDRAM 26. An AMBA bus 41 couples a processor core 44 to the processing engines 22a-22f and the FBI 38.

The FBI 38 controls data transfers on the FIFO bus 16 and collects status data on the readiness of the ports 28, 30, 32 of the MAC devices 14, 14', 14" to participate in data transfers over the FIFO bus 16. The ready status data is collected from the MAC devices 14, 14', 14" through a ready bus 42, which is also controlled by the FBI 38.

Referring again to FIG. 1, the processor core 44 uses software to perform a variety of functions. The functions may include data packet routing, exception handling, queue management, monitoring of data packet transfers, supporting network management protocols and/or providing local area network emulation.

The parallel processor 12 includes a PCI bus interface 46 that couples to a PCI bus 48. The PCI bus 48 can support communications between the parallel processor 12 and external processors. The other processors may control and/or reprogram the processor core 44 or other components 22a-22f, 38 of the multiprocessor 12.

Referring again to FIG. 2, the connections between the FBI 38 and the processing engines 22a-22f are shown. The FBI 38 includes a control module 50 for the ready bus 42 and a push engine 62. The control module 50 periodically collects receive-ready status data and transmit-ready status data from the MAC devices 14, 14', 14". The collected ready status data is stored in a set of status registers 54. The set includes separate registers for storing receive-ready status data and transmit-ready status data. The push engine 62 regularly sends the ready status data over the S bus 39 to scheduler threads located in the processing engines 22a-22f in response to commands from logic internal to the FBI 38.

The processing engines 22a-22f include separate receive-scheduler and transmit-scheduler threads. The receive-scheduler thread schedules the processing of data received from the FIFO bus 16. The transmit-scheduler thread schedules the processing of data to be transmitted to the FIFO bus 16.

The receive-scheduler thread assigns data forwarding and header processing tasks to other threads in the processing engines 22a-22f. These tasks include sharing operation of a push engine 62 that transports data from the receive FIFO buffer 58 in the FBI 38 to one of the storage queues in the SDRAM 26.

The transmit-scheduler thread also assigns data forwarding tasks to other threads in the processing engines 22a-22f. These tasks include sharing in operation of a pull engine 64, which moves data from the storage queues in the SDRAM 26 to the transmit FIFO buffer 60. The tasks also include directing the pull engine 62 to write transmission control and MAC device 14, 14', 14" address information to the FIFO buffer 60. Each data packet in the transmit FIFO buffer 60 has associated address and control information that control the retransmission over the FIFO bus 16.

To control data forwarding by the push and pull engines 62, 64, the execution threads of the processing engines 22a-22f send commands signals to FIFO command queues 66, 68 via a line 70. Components of the FBI 38 can also send commands to the command queues 66, 68 of push and pull engines 62, 64. For example, the ready bus controller 50 can send a command to the queue 66 that causes the push engine 62 to transfer ready status data from the status registers 54 to the processing engines 22a-22f. An arbiter 56 controls transmission of commands from the queues 66, 68 to the push and pull engines 62, 64.

The push and pull engines 62, 64 perform several types of tasks. The push and the pull engines 62, 64 are involved in bi-directional forwarding of data packets between the FIFO buffers 58, 60 and the SDRAM controller 36. The push and pull engines 62, 64 also operate a large hardware unit 71 located in the FBI 38. The push engine 62 also forwards ready status data from the set of status registers 54 to the receive- and transmit-scheduler threads located in the processing engines 22a-22f.

The hardware unit 71 performs various operations for the execution threads of the processing engines 22a-22f and includes a hash unit 72 and a scratchpad memory 73. The execution threads operate the hardware unit 71 by sending commands to the queues 66, 68. To perform the operations, the pull engine 64 retrieves input data over the S bus 39 from output transfer registers 80a-80f of the requesting processing engine 22a-22f. The pull engine 64 moves the retrieved data and associated commands to the hardware unit 71. The hardware unit 71 forwards results from the operations to the push engine 62. The push engine 62 uses command information from the command queue 66 and/or pull engine 64 to transmit the results back over the S bus 39 to input transfer registers 78a-78f of the requesting or destination processing engine 22a-22f.

Figure 3:
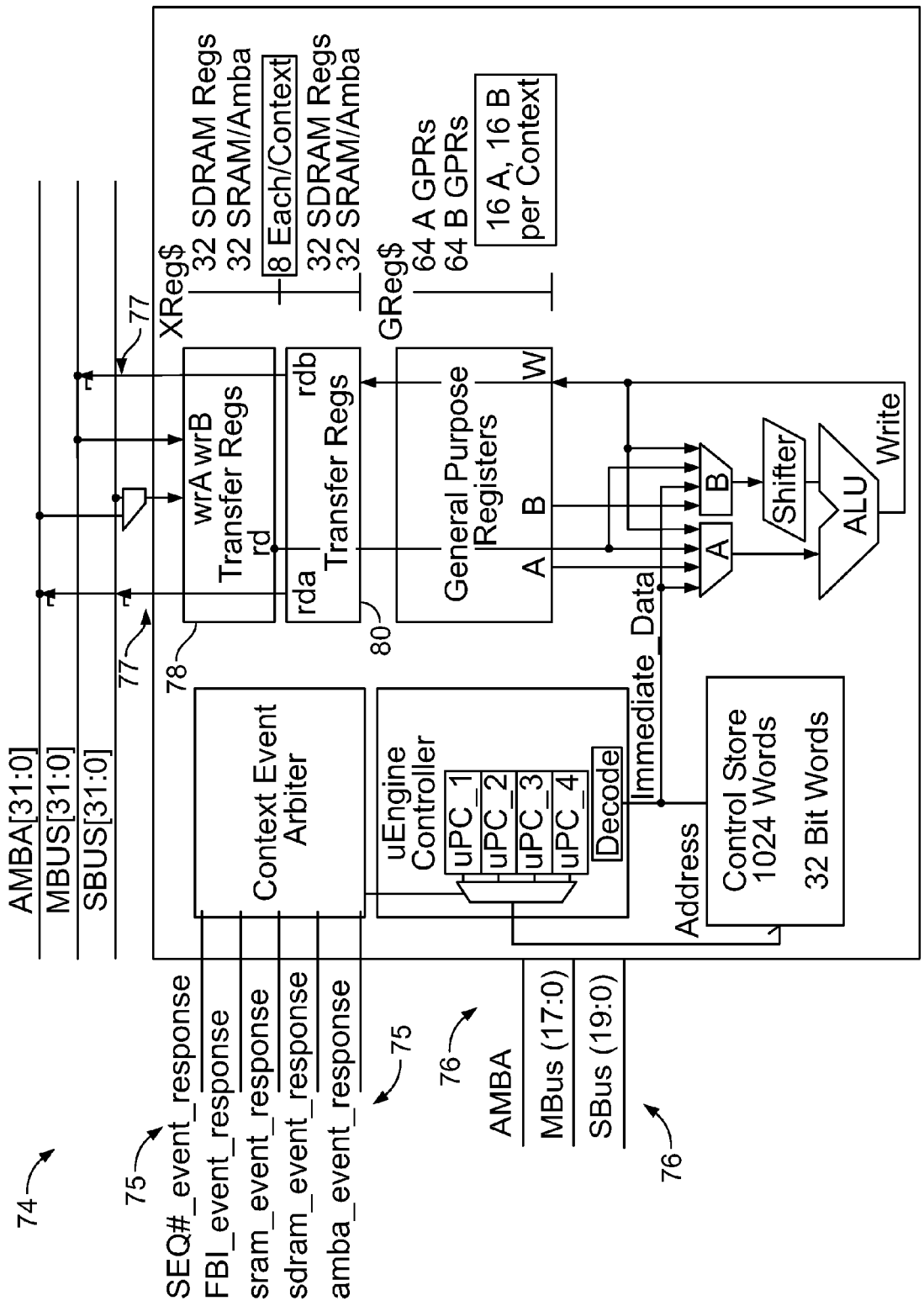
FIG. 3 is a block diagram of one of the parallel processing engines used by the processor of FIG. 1.

Referring to FIG. 3, one embodiment 74 of the processing engines 22a-22f is shown. The processing engines 22a-22f have input/output terminals 75-77 for control signals, address signals, and data. Control signals, address signals, and data are transferred to and from the processing engines 22a-22f over three busses, i.e., the M bus 40, the S bus 39, and the AMBA bus 41. The address signals identify both a processing engine 22a-22f and an execution thread so that external commands can independently address different threads. Data is received at and transmitted from respective input and output transfer registers 78, 80. Each input and output transfer register 78, 80 is assigned to an individual execution thread. To write data to or read data from a particular execution thread, an external device accesses one of the transfer registers 78, 80 assigned to the particular thread.

Figure 4:
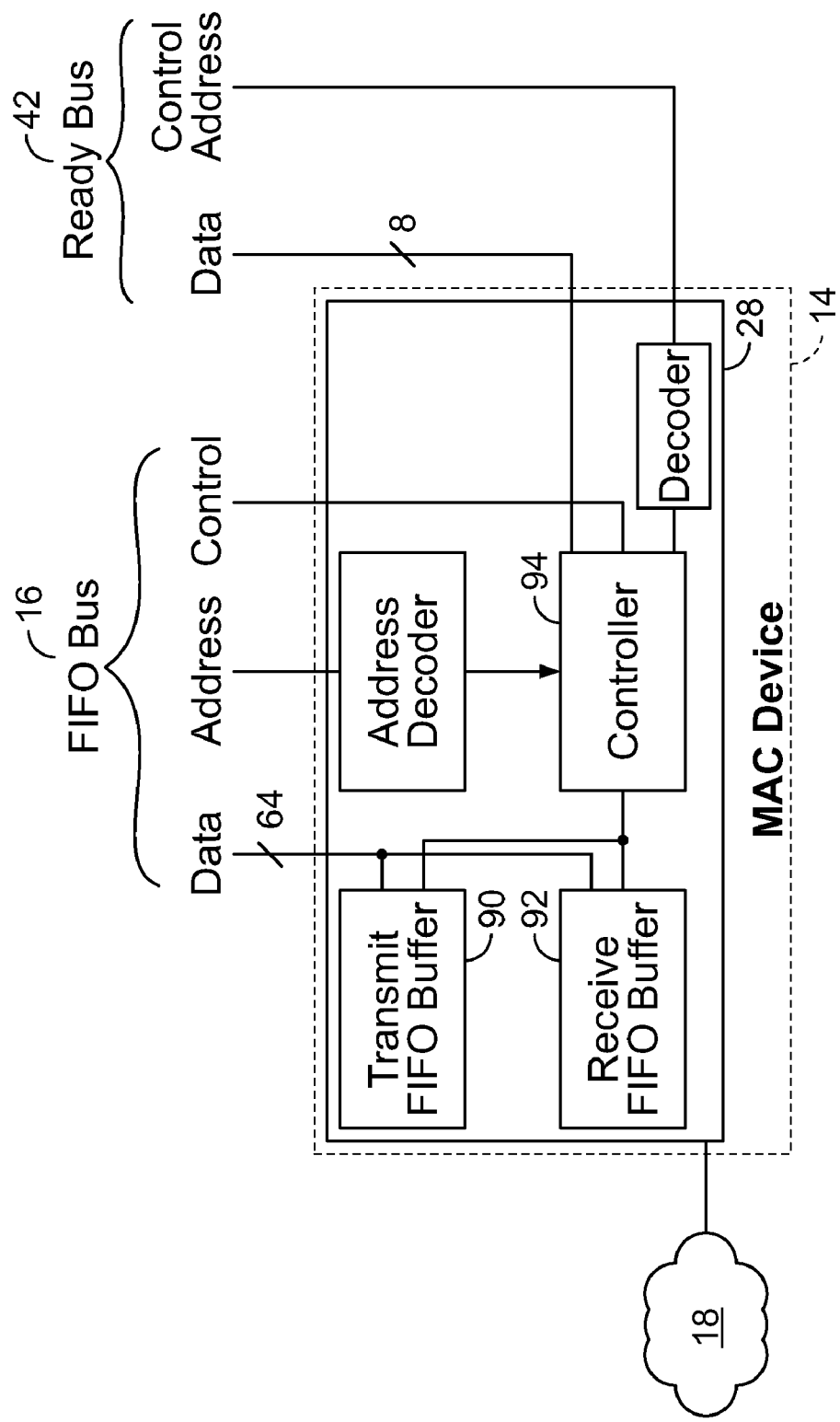
FIG. 4 is a block diagram of a MAC port coupled to the parallel processor of FIG. 1.

Referring to FIG. 4, the port 28 of the MAC device 14 is shown. The port 28 has transmit and receive FIFO buffers 90, 92 for storing data prior to transmission to and after reception from the FIFO bus 16, respectively. Both buffers 90, 92 have entries of fixed size that are multiples of 64 bytes, i.e., the size of data packets on the FIFO bus 16. The port 28 also includes address decoders and a controller 94. The controller 94 controls both protocol transfers over the FIFO bus 16 and responses to ready status queries from the ready bus 42. The responses to the queries indicate whether the transmit buffer 90 has a 64 byte data packet to transmit and/or whether the receive buffer 92 has space to receive a 64 byte data packet.

The various ports 28, 30, 32 of the MAC devices 14, 14', 14" may support different data transfer rates. The ports 28, 30 of the MAC devices 14, 14' support transfer rates of about ten or one hundred megabits of data per second. The port 32 of the MAC device 14" may have a transfer rate of up to about one gigabit per second.

The ready bus 42 includes control/address and data lines. The control/address lines enable selection of a transaction type and a port 28, 30, 32 of the MAC devices 14, 14', 14". The data line transfers receive-ready status data and transmit-ready status data to the FBI 38 in response to status queries from the control module 50 for the ready bus 42.

Referring to 5A, the registers $R_1, R_2, R_3$ that store receive-ready status data are shown. The registers $R_1$ and $R_2$ store receive-ready status data for individual MAC ports 28, 30, 32. The readiness of each MAC port 28, 30, 32 to transmit a data packet to the FIFO bus 16 is indicated by the value of an associated bit or flag stored in one of the registers $R_1, R_2$. One logic value of the bit or flag indicates that the associated port 28, 30, 32 has a data packet ready to transmit, and the other logic value indicates the associated port 28, 30, 323 has no ready data packets. Different ports 28, 30, 32 may have data packets of different sizes, but the receive scheduler thread knows the packet size associated with each port 28, 30, 32.

The registers $R_2$ and $R_3$ have 32 bits each and thus, can accommodate receive-ready status data for up to 64 different MAC ports 28, 30, 32.

The register $R_3$ stores a cyclic counter value, which acts as a time stamp for the receive-status data stored in registers $R_1$, $R_2$. The counter value is incremented each time new receive-status data is collected. By comparing the counter value to a previously received counter value, the scheduler thread can determine whether the present receive-status data is new or stale, i.e., whether the data has already been seen.

Figure 5A:
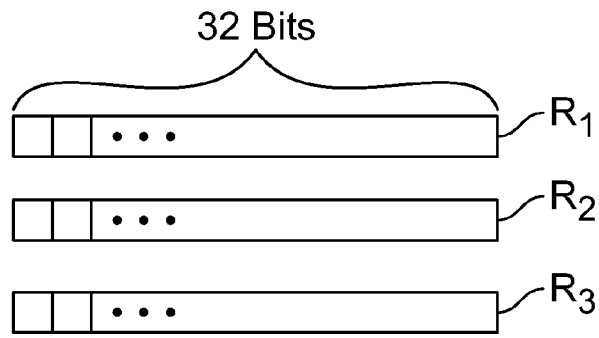
FIG. 5A shows the status registers for receive-status data.
Figure 5B:
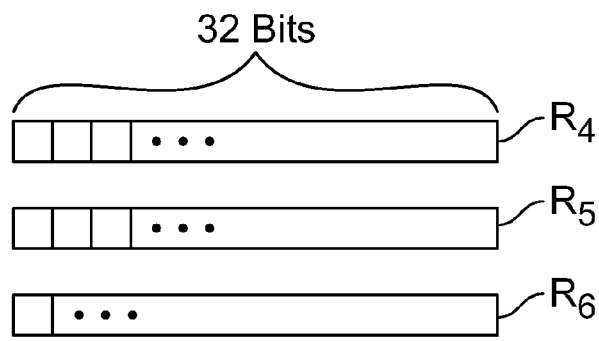
FIG. 5B shows the status registers for transmit-status data.

Referring to FIG. 5B, the registers $R_4, R_5, R_6$ that store transmit-ready status data are shown. The registers $R_4$ and $R_4$ store transmit-ready status data for individual MAC ports 28, 30, 32. Each MAC port 28, 30, 32 has an associated bit or flag in one of the registers $R_4$ and $R_4$. One logic value of the bit or flag indicates that the associated port 28, 30, 32 has enough space to receive a data packet, and the other logic value indicates the associated port 28, 30, 32 does not have enough space.

The registers $R_4$ and $R_5$ have a total of 64 bits and thus, can report transmit ready status for up to 64 MAC ports 28, 30, 32.

Figure 5C:
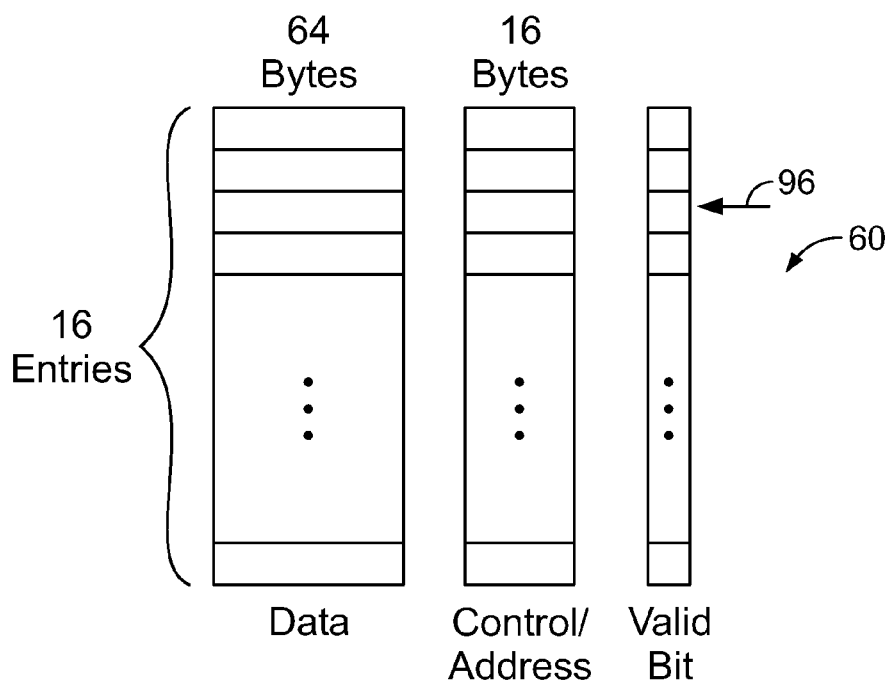
FIG. 5C shows the transmit FIFO buffer located in the FIFO bus interface of FIG. 2.

Referring to FIG. 5C, the number stored in register $R_6$ indicates the position of a remove pointer 96 in the transmit FIFO buffer 60. For an embodiment in which the transmit FIFO buffer 60 has sixteen entries, the position of the remove pointer is represented as a 4-bit number.

Since the FBI 38 transmits 64-byte data packets from the buffer 60 according to a FIFO scheme, the remove pointer 96 indicates which data packets are scheduled but not transmitted. The position of the pointer 96 can be used to determine which MAC ports 28, 30, 32 have been scheduled to receive a data packet but have not yet received a data packet. Such ports 28, 30, 32 may have status data in registers $R_4$, $R_5$ indicating an availability to receive a data packet even though the available space has already been assigned to a waiting data packet.

The transmit scheduler thread can use the position of the remove pointer 96 to interpret transmit-ready status data of the registers $R_4$, $R_5$. From the position of the remove pointer 96, the transmit scheduler thread identifies MAC ports 28, 30, 32 already scheduled to receive a data packet. The transmit scheduler thread does not schedule a new data packet for such ports, because the waiting and already scheduled data packet may take the available space therein.

In the parallel processor 12, the collection of ready status data is asynchronous with respect to scheduling of data packet transfers. The asynchronous relationship enables both the collection of ready status data and the scheduling of data packets to have higher effective bandwidths. The asynchronous relationship also introduces some unpredictability into latencies associated with the transfer of newly collected ready status data to scheduler threads.

Figure 6:
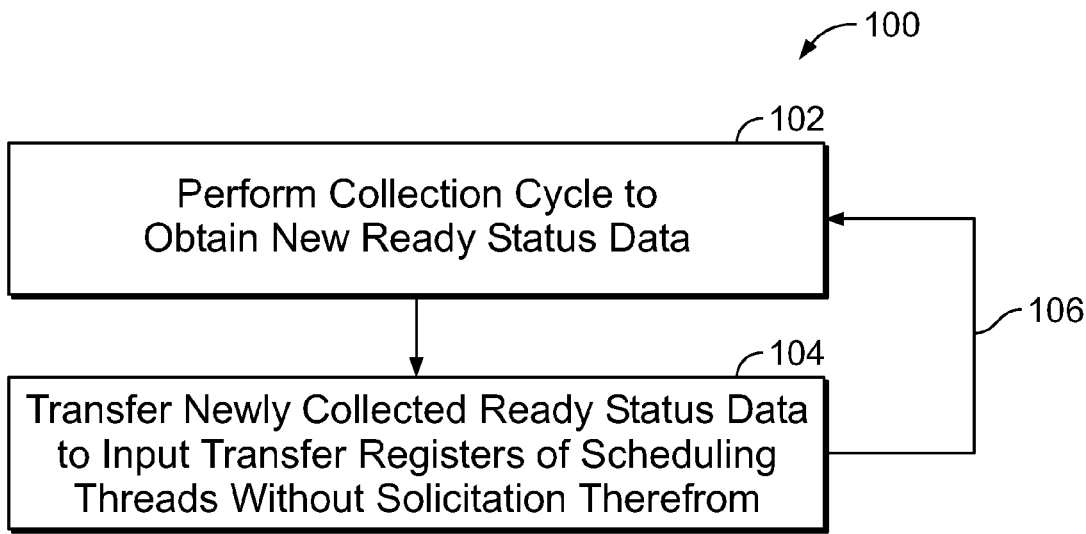
FIG. 6 is a flow chart showing a process for providing ready-status data to scheduler threads.

Referring to FIG. 6, a process 100 by which the FBI 38 provides ready status data to the scheduler threads is shown. The FBI 38 performs 102 a collection cycle in which new ready status data is obtained from the MAC devices 14, 14', 14'' interactively via the ready bus 42. In response to completing the collection cycle, the FBI 38 performs an unsolicited transfer 104 of the newly collected ready status data to the input transfer registers 78a-78f assigned to the scheduler threads. In an unsolicited data transfer, the destination device for the transfer does not request the transfer. The transfer of ready status data from the FBI 38 to destination processing engines 22a-22f and scheduling threads proceeds without any request from the processing engines 22a-22f. Instead, the FBI 38 automatically performs the transfer in response to finishing a collection cycle for the ready status data. The completion of each collection cycle causes issuance of a command to the push engine 62, which transfers the ready bus data to the processing engines 22a-22f. After completing the transfer, the FBI 38 loops back 106 to collect new ready status data.

Making transfers of new ready status data unsolicited lowers latencies for delivering such data to scheduler threads. Since latencies in delivering such data can cause scheduling errors, making the transfer of ready status data unsolicited can lower numbers of occurrences of scheduling errors.

Referring to FIG. 7, a process 110 by which the FBI 38 collects ready status data is shown. Separate collection cycles are performed to collect receive-ready status data and to collect transmit-ready status data. Each collection cycle also initiates an unsolicited transfer of at least a portion of the collected ready status data to the processing engines 22a-22f.

To start a new collection cycle, the control module 50 for the ready bus 42 selects 112 the addresses to be polled for ready status data. The selection may be for all addresses of the MAC ports 28, 30, 32 connected to the FIFO bus 16 or for a sub-range of the addresses. If a sub-range is selected, the collection of new ready status data spans several cycles, a portion of the MAC ports 28, 30, 32 being polled in each cycle. The sub-range polled in collection cycles may be programmed into the processor core 44 or the FBI 38.

The control module 50 polls 114 by sending status queries over the ready bus 42 to the selected ports 28, 30, 32 of the MAC devices 14, 14', 14''. In response to the queries, the control module 50 receives 116 new ready status data from the polled ports 28, 30, 32. A response to a query for receive-ready status data indicates whether the responding port 28, 30, 32 has a data packet ready to transmit. A response to a query for transmit-ready status indicates whether the responding port 28, 30, 32 has space available to receive another data packet.

The control module 50 writes 118 new ready status data, which has been from the responses, to the status registers $R_1$, $R_2$, $R_4$, $R_5$, shown in FIGS. 5A-5B. The control module 50 also increments 120 the counter value in status register $R_3$. Incrementing the counter value updates the time stamp associated with the newly collected ready status data. After updating the time stamp, the FBI 38 performs an unsolicited transfer of the newly collected ready status data to the scheduler threads located in processing engines 22a-22f.

The FBI 38 transmits 126 data packets from the transmit FIFO buffer 60 asynchronously with respect to the collection of ready status data from the MAC devices 14, 14', 14''. In response to each transmission, the FBI 38 advances 128 the remove pointer 96 of the transmit FIFO buffer 60 and writes 130 the new position of the remove pointer 96 to status register $R_6$. The number stored in the status register $R_6$ reflects the present position of the remove pointer 96 of the transmit FIFO buffer 60.

Figure 8:
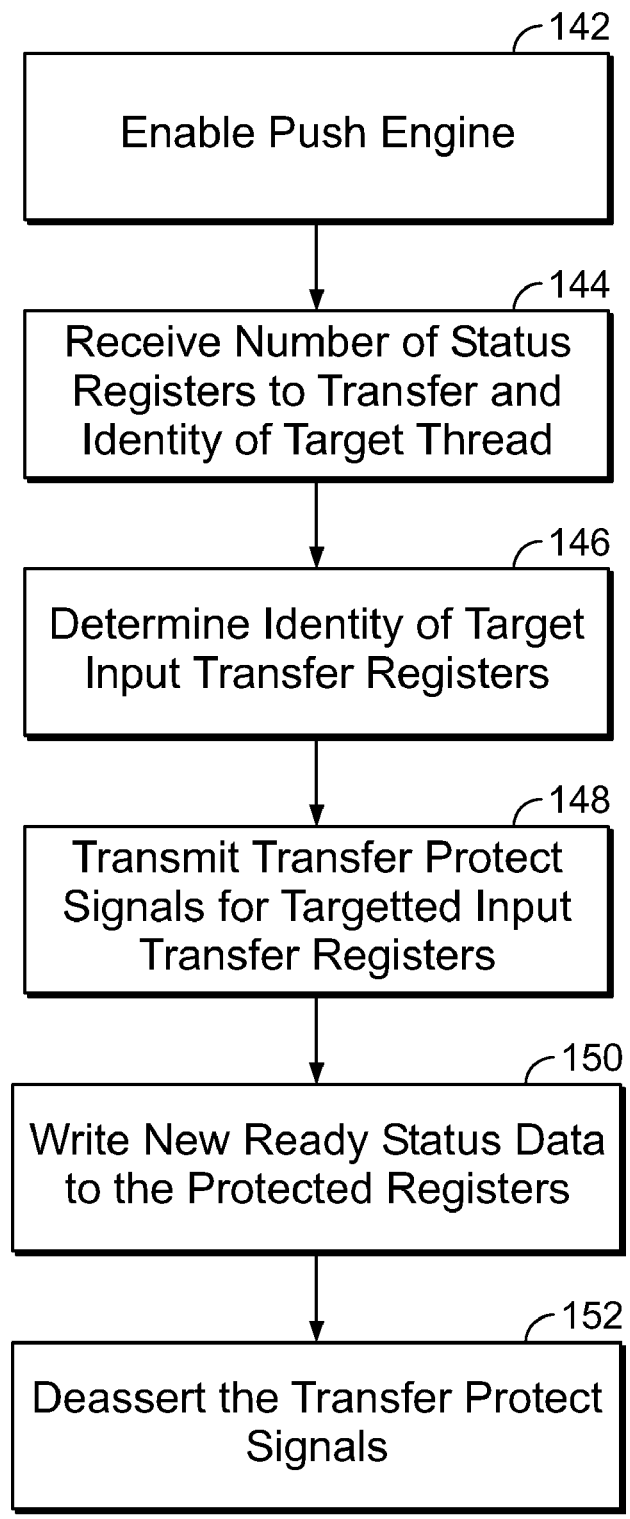
FIG. 8 is a flow chart for a process for transferring newly collected ready status data to the scheduler threads.

Referring to FIG. 8, a process 140 by which the FBI 38 transfers receive-ready and transmit-ready status data to the respective receive and transmit scheduler threads is shown. The FBI 36 transfers the ready status data via the S bus 39 when the S bus 39 is not being used for communications with the SRAM controller 34.

Completion of a collection cycle enables 142 the push engine 62 to transfer ready status data from the status registers 54 to the appropriate execution threads, i.e., scheduler threads. The push engine 62 reads 144 both a value for the number of the status registers $R_1$-$R_3$ or $R_4$-$R_6$ to be transferred and the identity of the target scheduler thread. One, two, or three status registers may be transferred in one cycle. The count and identity of the scheduler threads, i.e., for both the thread and the associated processing engine 22a-22f, are stored in control registers 52.

Transfers of 1, 2 or 3 of the status registers $R_1$-$R_6$ write to the 1, 2 or 3 lowest consecutive input transfer registers 78a-78f assigned to the target scheduler thread. But, the transfers may also alternate targeting of the input transfer registers 78a-78f. To alternate targets, the push engine 62 sends consecutive transfers to different input transfer registers 78a-78f assigned to the same scheduler thread. For example, a first transfer of two of the status registers $R_1$-$R_3$ could be written to the two lowest input transfer registers, and the next transfer would then be written to the two next-lowest input transfer registers. From the count and alternate-select status, the push engine 62 determines 146 which input transfer registers 78a-78f to write during the transfer.

The push engine 62 transmits 148 a transfer protect control signal to the target input transfer registers 78a-78f. The transfer protect signal protects the target transfer registers 78a-78f against read-write conflicts during transfers. The transfer protect signal blocks reads of the registers 78a-78f by the associated scheduler threads. While protected from such reads, the push engine 62 writes 150 the new ready status data to the input transfer registers 78a-78f.

After completing a transfer of ready status data, the push engine 62 stops 152 transmitting the transfer protect signal. When the protect signal is no longer asserted, the scheduler threads can read the input transfer registers 78a-78f. The scheduler threads reads the ready status data from the input transfer registers 78a-78f in the order written to avoid other read-write conflicts.

Figure 9:
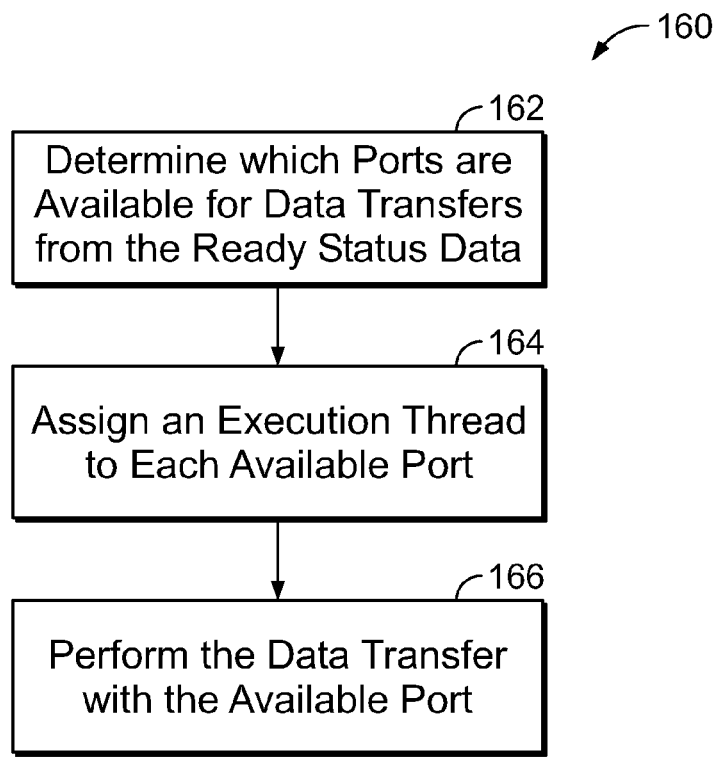
FIG. 9 is a flow chart for a process that performs data transfers responsive to ready status data.

Referring to FIG. 9, a process 160 that performs data transfers responsive to ready status data is shown. To schedule a transfer, the appropriate scheduler thread determines 162 which MAC ports 28, 30, 32 are available from the values of the new ready status data. For the available ports 28, 30, 32, the scheduling thread selects 164 an available execution thread to handle the data transfer and signals the selected thread. The selected thread and FBI 38 perform the scheduled data transfer 166 the scheduled data transfer.

For receive-ready status data, the scheduler thread also compares the time stamp of the status data to the time-stamp of time stamps of previous receive-ready status data. If the time stamp has an old value the ready status data is stale, and the receive scheduler thread stops without scheduling data transfers. Otherwise, the receive scheduler thread proceeds as described above.

For transmit-ready status data, the scheduler thread uses present values of the remove pointer 96 to determine whether any of the available ports are already scheduled to receive a data packet. Any such devices are not scheduled for another data transmission.

While various embodiments have been described in the detailed description, the description is intended to illustrate and not to limit the scope of the invention, which is defined by the appended claims. Other aspects, advantages, and modifications are within the scope of the claims.

What is claimed is:

1. A processor, comprising:
    a module configured to collect status data from media access devices connected to a bus, the status data indicating readiness of the media access devices to participate in data transfers, the status data comprising data indicating whether a one of the media access devices has received packet data;
    one or more processing engines to schedule transfers of packet data; and
    a push engine to perform unsolicited transfers of the status data to the processing engines in response to the module collecting new status data.

2. The processor of claim 1, wherein the processing engines comprise:
    one or more input transfer registers to receive the unsolicited transfers of status data for use to schedule the transfers of packet data.

3. The processor of claim 2, wherein the processing engines use a portion of received new status data to schedule retrievals of packet data from the media access devices.

4. The processor of claim 2, wherein the processing engines use a portion of the received status data to schedule transmissions of packet data.

5. The processor of claim 4, wherein the processing engines use a portion of the received status data to determine whether scheduled transmissions of packet data have been completed.

6. The processor of claim 2, wherein a portion of the status data are flags indicative of whether associated media access devices have packet data to transmit.

7. The processor of claim 2, wherein a portion of the status data includes flags indicative of whether associated media access devices have space to receive packet data.

8. The processor of claim 1, wherein the module is configured to poll the media access devices for the status data over a second bus.

9. The processor of claim 1 in which the processing engines schedule the transfer of data packets independently of the module collecting status data from the media access devices.

10. The processor of claim 9 in which the processing engines schedule the transfer of data packets from a device to the bus independently of the readiness of other devices to receive the data, and schedule the transfer of data from the bus to a device independently of the readiness other devices to send the data.

11. A method of transferring data packets over a bus, comprising:
    collecting information on readiness of media access devices connected to the bus to one of transmit and receive data packets; and
    transferring a portion of the collected information to a processing engine configured to schedule data transfers, the transferring being unsolicited by the processing engine.

12. The method of claim 11, further comprising:
    scheduling data transfers with a portion of the media access devices based on the transferred portion of the collected information.

13. The method of claim 12, wherein scheduling further includes:
    determining whether the transferred information is at least partly new; and
    wherein the scheduling is performed in response to the transferred information being at least partly new.

14. The method of claim 12, wherein scheduling further comprises:
    determining whether an earlier scheduled data transfer have been completed from the transferred information.

15. The method of claim 12, wherein collecting further comprises:
    polling the media access devices for ready status data on the availability of ports thereon; and
    receiving ready status data associated with individual ones of the devices in response to the polling.

16. The method of claim 12, wherein determining includes comparing a value of a time stamp transferred with the information to a previous value of the time stamp.

17. The method of claim 16, wherein collecting further comprises:
    writing the received ready status data to a status register; and
    scheduling transfers of data packets over the bus in response to the transferred portion of the ready status data.

18. The method of claim 11, wherein the transferred portion of the information includes flags that indicate whether associated ports of the devices have one of space to receive data packets and data packets ready to transmit over the bus.

19. The method of claim 18, further comprising:
    polling the ports of the devices over a second bus to determine values of the flags.

20. An article comprising a computer-readable medium which stores executable instructions for transferring data packets over a bus, the instructions causing a processor to:
    collect information on readiness of media access devices connected to the bus to one of transmit and receive data packets; and
    transfer a portion of the collected information to a processing engine configured to schedule data transfers, the transferring being unsolicited by the processing engine.

21. The article of claim 20, the instructions further causing the processor to:
    schedule data transfers with a portion of the devices based on the transferred portion of the collected information.

22. The article of claim 21, the instructions further causing the processor to:
    determine whether the transferred information is at least partly new; and
    wherein instructions causing the processor to schedule are performed in response to determining that the transferred information being at least partly new.

* * * * *